United States Patent [19]

Simmons

[11] 4,291,852
[45] Sep. 29, 1981

[54] PARACHUTE RELEASE FOR CARGO AIRCRAFT

[75] Inventor: Gerald C. Simmons, Bothell, Wash.

[73] Assignee: The Boeing Company, Seattle, Wash.

[21] Appl. No.: 54,102

[22] Filed: Jul. 2, 1979

[51] Int. Cl.³ .................. B64D 17/62; B64D 17/78
[52] U.S. Cl. .......................... 244/147; 244/137 R; 244/138 R
[58] Field of Search .......... 244/118.1, 118.3, 137 R, 244/147, 139, 138 R, 138 A

[56] References Cited

U.S. PATENT DOCUMENTS

| 2,032,824 | 3/1936 | Adams | 244/147 |
| 3,379,096 | 4/1968 | Gillham et al. | 244/137 R |
| 3,401,905 | 9/1968 | Rohrlick | 244/137 R |
| 3,485,466 | 12/1969 | Prewitt | 244/137 R |
| 4,113,208 | 9/1978 | Manfredi | 244/147 |
| 4,161,301 | 7/1979 | Beardsley | 244/137 R |

FOREIGN PATENT DOCUMENTS

| 524841 | 5/1956 | Canada | 244/147 |
| 1074825 | 7/1967 | United Kingdom | 244/137 R |

Primary Examiner—Galen L. Barefoot
Attorney, Agent, or Firm—Robert L. Gullette; Ronald E. Suter; Bernard A. Donahue

[57] ABSTRACT

A floor mounted rotatable arm assembly which supports a removable parachute holder. A release mechanism operates the parachute holder to release a parachute after the arm assembly has been rotated from a stowed position faired with the floor of the aircraft cargo space, wherein the parachute is face-up, to a deployed position aft thereof, wherein the parachute is face-down and available for release.

10 Claims, 10 Drawing Figures

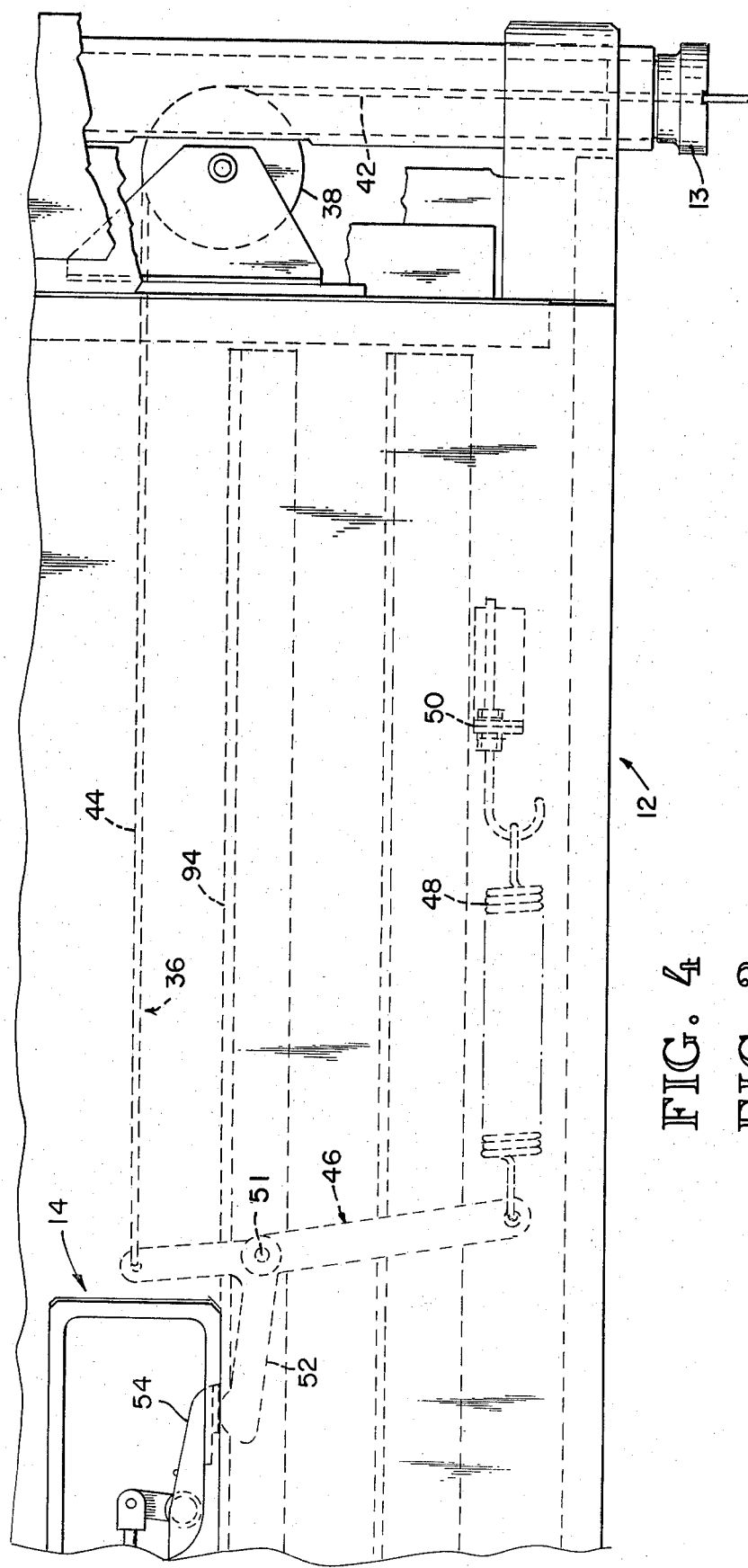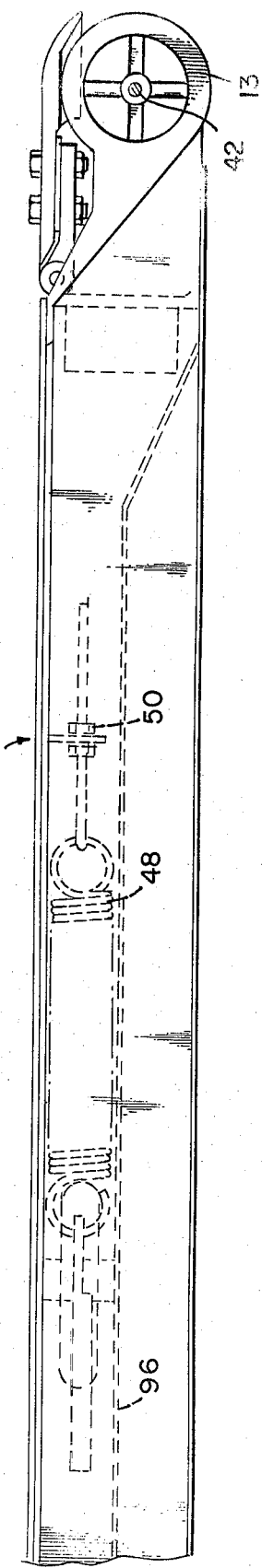
FIG. 4
FIG. 3

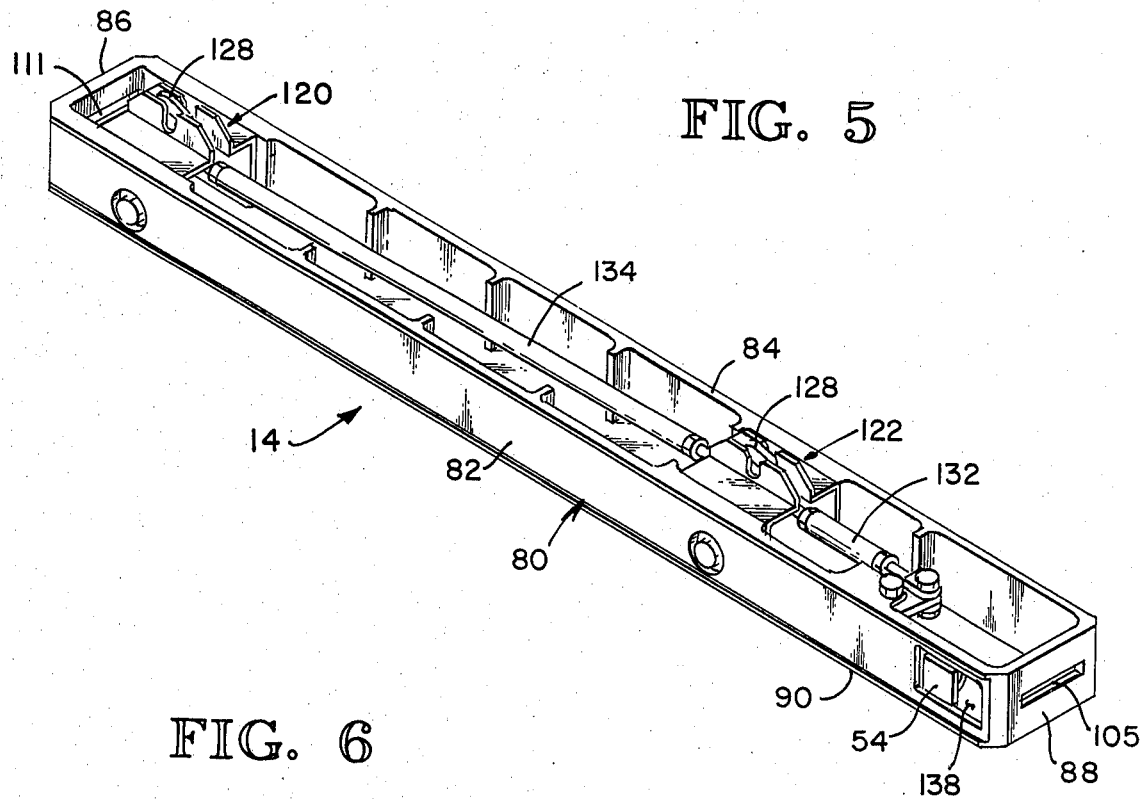
FIG. 5
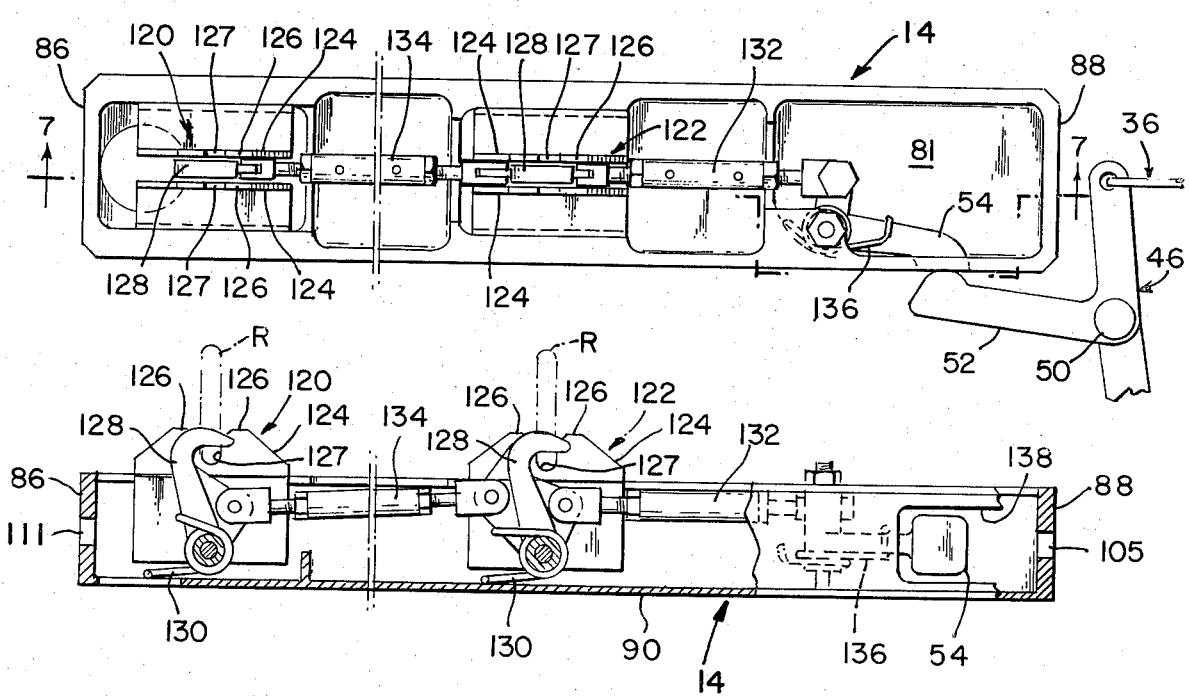
FIG. 6
FIG. 7

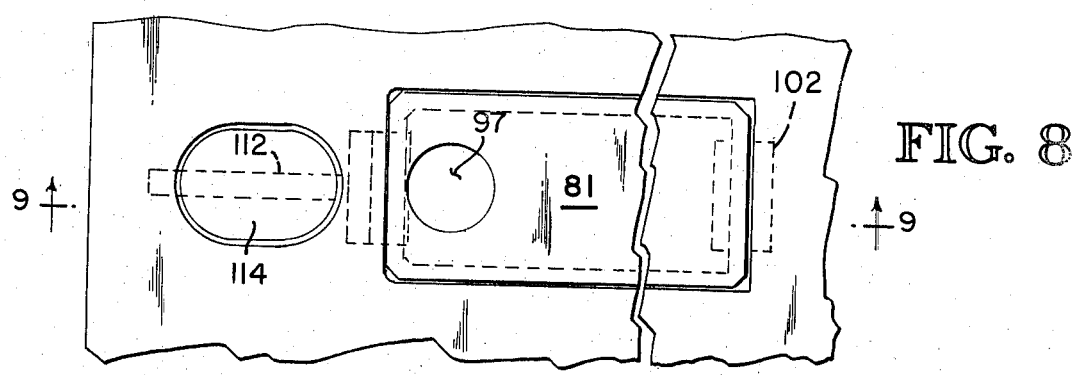
FIG. 8
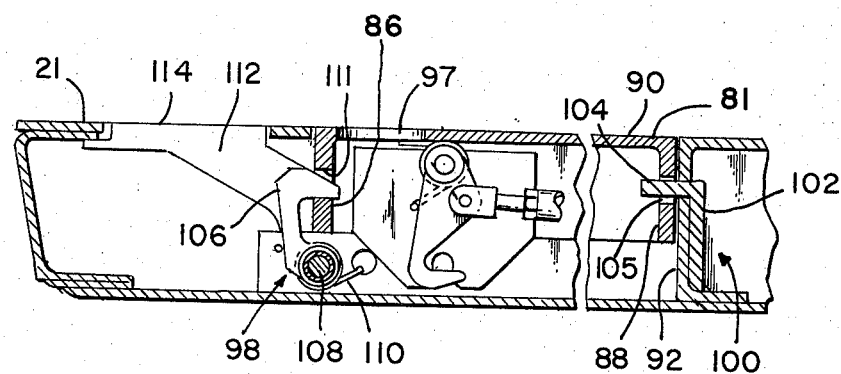
FIG. 9
FIG. 10
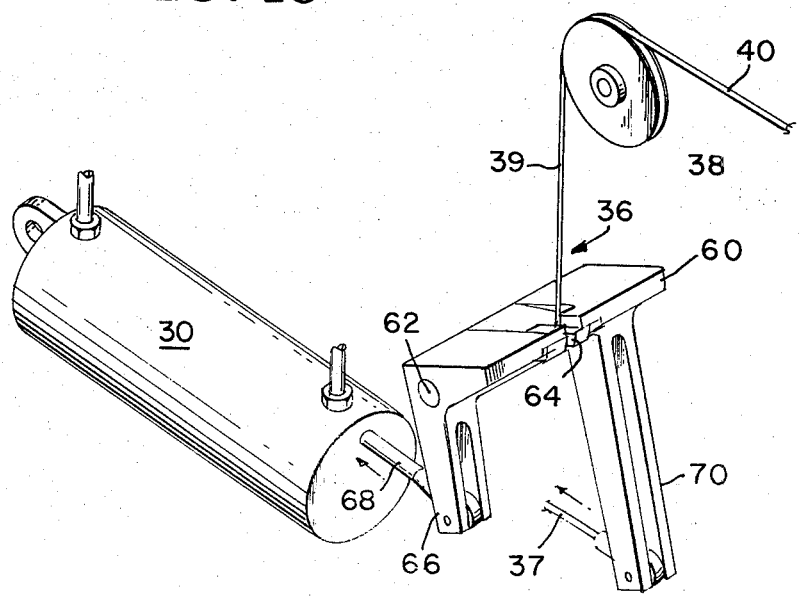

PARACHUTE RELEASE FOR CARGO AIRCRAFT

BACKGROUND OF THE INVENTION

This invention relates to methods and apparatus for releasing a parachute from an aircraft. One application of the invention illustrated and described herein pertains to parachute release apparatus for use with an aerial cargo delivery system, wherein the apparatus releases a drogue or extraction parachute from a cargo carrying aircraft, although the invention may be utilized in other applications or environments.

The type of aircraft with which this invention may be used typically includes a raised tail assembly and a cargo space which opens aft and below the tail assembly for purposes of loading, unloading and aerial cargo delivery. Examples of such aircraft are the C-119, C-123, C-130, C-141, and C-5A. To effect an aerial cargo delivery, a drogue parachute is deployed from the open aft end of the cargo space to exert an extraction force on the cargo or load contained therein. This extraction force pulls the cargo rearwardly from the aircraft through the open aft end of the cargo space. For high altitude airdrop, additional recovery parachutes are then deployed from the cargo. For low altitude airdrop, (often referred to as "LAPES" airdrop), the cargo descends to the ground without deployment of recovery chute(s). In either system, the extraction force is applied to the cargo by an extraction parachute(s) through a force transfer device, commonly referred to as a "tow plate."

Cargo aircraft of the type described currently use a "bomb-rack" pendulum pivot release mechanism to deploy the drogue or extraction parachute. This mechanism includes a pendulum pivot which is mounted in the interior crown of the cargo space ceiling, usually at a height greater than 10 inches above the floor of the cargo space, and a parachute holder which is supported from the ceiling of the cargo space forward of the pendulum pivot. The parachute is attached to one end of a pendulum line, the other end of which is secured to the pivot. The pivot provides a suspension point located to the rear of the open aft end of the cargo space and is cut away or relieved at its aft end to permit the other end of the cable to separate therefrom upon swinging aft beyond approximately vertical. The parachute holder includes spaced-apart hooks, which engage appropriate rings or other fasteners on the parachute, together with a release mechanism for opening the hooks to release the parachute. In the operation, the pendulum first is attached to the pivot and then is positioned with its length extending forwardly along the ceiling of the cargo space. The parachute then is secured to the parachute holder and is held thereby adjacent to the aircraft ceiling. Upon release from the parachute holder, the parachute swings by gravity on the pendulum in an aft direction and out of the open aft end of the cargo space, whereupon the cable separates from the pivot to effect separation of the parachute from the aircraft.

The pendulum pivot release mechanism is unsatisfactory in many practical applications. Since the pendulum is located beyond the normal reach of the load master standing on the floor of the cargo space, the load master must lower the parachute holder to the floor in order to load the parachute thereon. He then must raise the parachute and the holder toward the ceiling of the cargo space, must stand on an appropriate step support to attach the pendulum cable to the pendulum pivot and, finally, must lash the parachute line to an appropriate line restraint fitting on the floor of the cargo space. The proximity of the cargo doors and/or cargo ramp at the aft end of the cargo space poses a significant safety hazard to the load master so that, in most practical cases, both are closed prior to and during parachute loading, as well as while rerigging the parachute release system during multiple airdrops, increasing drop zone time. Furthermore, since the mechanism is made up of two separate assemblies (i.e. the fixed pivot or release mechanism, and a parachute holder), precise rigging and operational sequencing must be followed in order to ensure a successful parachute release. In many practical applications, operational reliability of the parachute release system therefore tends to be unsatisfactory.

In the YC-14 cargo aircraft, fabricated by the assignee of the present invention, the aforementioned pendulum release mechanism is highly undesirable because the body of the aircraft is somewhat wider than standard cargo aircraft of the type described and the overhead location required for the pendulum release pivot is above the cargo door. As a consequence, secondary structure are required to support the pendulum pivot and the load master cannot reach it from the cargo space floor, even when supported on a step support. To attach the pendulum cable to the pendulum pivot, therefore, the load master must climb upward along the inside of the closed cargo door. Additionally, since the pendulum release pivot must be moved clear of the cargo door when the cargo door is opened and closed, the secondary structure in order to provide such movement tends to be complex, with attendant uneconomical fabrication and maintenance costs.

SUMMARY OF THE INVENTION

This invention provides a method and apparatus for releasing a parachute from an aircraft. A parachute is movable in an aft direction along a curved path from a face-up stowed position adjacent the floor of the aircraft cargo space to a face-down deployed position aft of the cargo space. Upon assuming the deployed position, the parachute may be released to effect separation of the parachute from the aircraft.

According to one preferred embodiment of the invention particularly suitable for use with an aircraft having a rear loading ramp which is movable between a raised position at least partially closing the open aft end of the cargo space, and a lowered position in which the upper surface of the loading ramp coincides with or is substantially coplanar with the floor of the cargo space, an arm assembly is mounted rotatively by the loading ramp adjacent the rear upper edge thereof. This assembly is movable along the aforementioned curved path between a stowed position, preferably faired with the upper surface of the loading ramp, and a deployed position projecting aft from the loading ramp, preferably at a downwardly inclined attitude from the rear upper edge thereof. A parachute holder is operative associated with the arm assembly for holding the parachute for conjoint movement therewith and for releasing the parachute from the arm assembly, upon assuming the deployed position, to effect separation of the parachute from the aircraft. A release mechanism operatively connected with the parachute holder controls parachute release.

The parachute holder is made up of an elongated housing containing appropriate parachute attachment devices. The arm assembly includes an elongated receptacle within which this housing is insertable, along with fore and aft end hold down mechanisms for securing the housing within the receptacle, either in an upright position in which the parachute attachment devices are exposed to accept a parachute, or an inverted position in which these devices are hidden and the housing is faired with the arm assembly. With this construction, the parachute holder may be removed from the arm assembly and secured to a parachute independently of the arm assembly, whereupon the two may be re-attached to the arm assembly in preparation for parachute deployment. It will be recognized, however, that the parachute holder could be fabricated as a non-removable subassembly within or as part of the arm assembly.

Thus, it will be appreciated from the foregoing summary that this invention, by locating the parachute adjacent the cargo space floor and providing a simplified deployment assembly, reduces inconvenience and risk to the flight crew and load master, minimizes drop zone time required for multiple airdrops, and affords simplified yet reliable parachute release sequencing. As a consequence, this invention provides parachute release apparatus which surpass and are unparalled by existing parachute release apparatus, especially the "bomb-rack" pendulum pivot release mechanism. Furthermore, as applied to the YC-14 aircraft, or other aircraft in which ceiling mounts are impractical, this invention for the first time provides such aircraft with a practical, safe and light-weight parachute release apparatus.

The upper surface of the aforementioned rear loading ramp constitutes a generally coplanar extension of the floor of the cargo space when the ramp is positioned in its lowered position. It will be recognized, however, that although the ramp customarily is positioned in such a lowered position during deployment of a parachute incidental to an aerial cargo delivery operation the ramp additionally could be lowerable further to a ground loading position in which it is inclined downwardly from the aft terminus of the cargo space floor. This invention may be utilized with this and other aircraft constructions including constructions which do not include such a loading ramp. In the latter instance, the arm may be mounted immediately adjacent the aft terminus of the floor of the cargo space. As used herein, therefore, the term "floor of the cargo space" refers to a surface formed by or within the cargo space or by a loading ramp or equivalent rear extension of the cargo space. Furthermore, the terms "front" and "rear" and likewise the terms "fore" and "aft" as used herein refer to corresponding portions of the aircraft and are not intended to limit usage of the present invention to operation in a specific direction of movement or attitude.

These and other features, objects and advantages of the present invention will become apparent from the detailed description and claims to follow, taken in conjunction with the accompanying drawings in which like parts bear like reference numerals.

BRIEF DESCRIPTION OF THE DRAWINGS

FIG. 3 is a section taken along the line 3—3 in FIG. 2;

FIG. 4 is a top plan view of FIG. 3;

FIG. 5 is a perspective view of the parachute holder of the FIG. 1 apparatus;

FIG. 6 is a fragmentary top plan view of the FIG. 5 parachute holder;

FIG. 7 is a section taken along the line 7—7 in FIG. 6;

FIG. 8 is a fragmentary top plan view taken along the line 8—8 in FIG. 1;

FIG. 9 is a section taken along the line 9—9 in FIG. 8;

FIG. 10 is a schematic depicting operation of the parachute holder release mechanism.

DETAILED DESCRIPTION OF THE DRAWINGS

Figure 2:
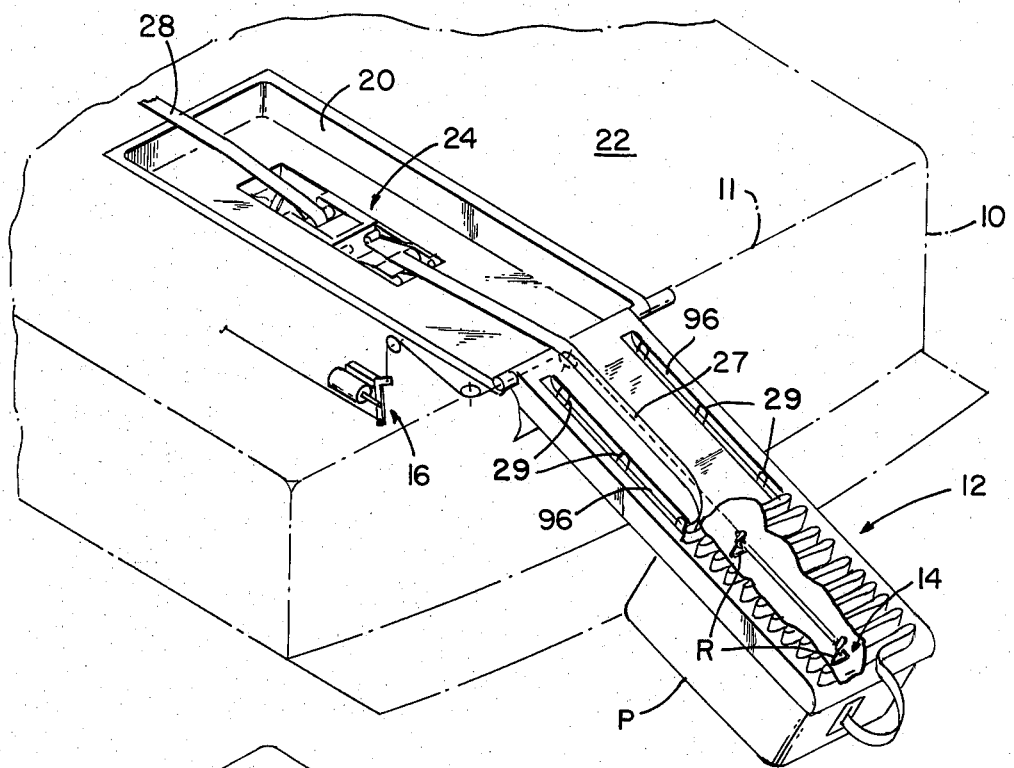
FIG. 2 is a perspective view generally similar to FIG. 1, depicting the arm assembly in its deployed position with a parachute secured thereto.
Figure 1:
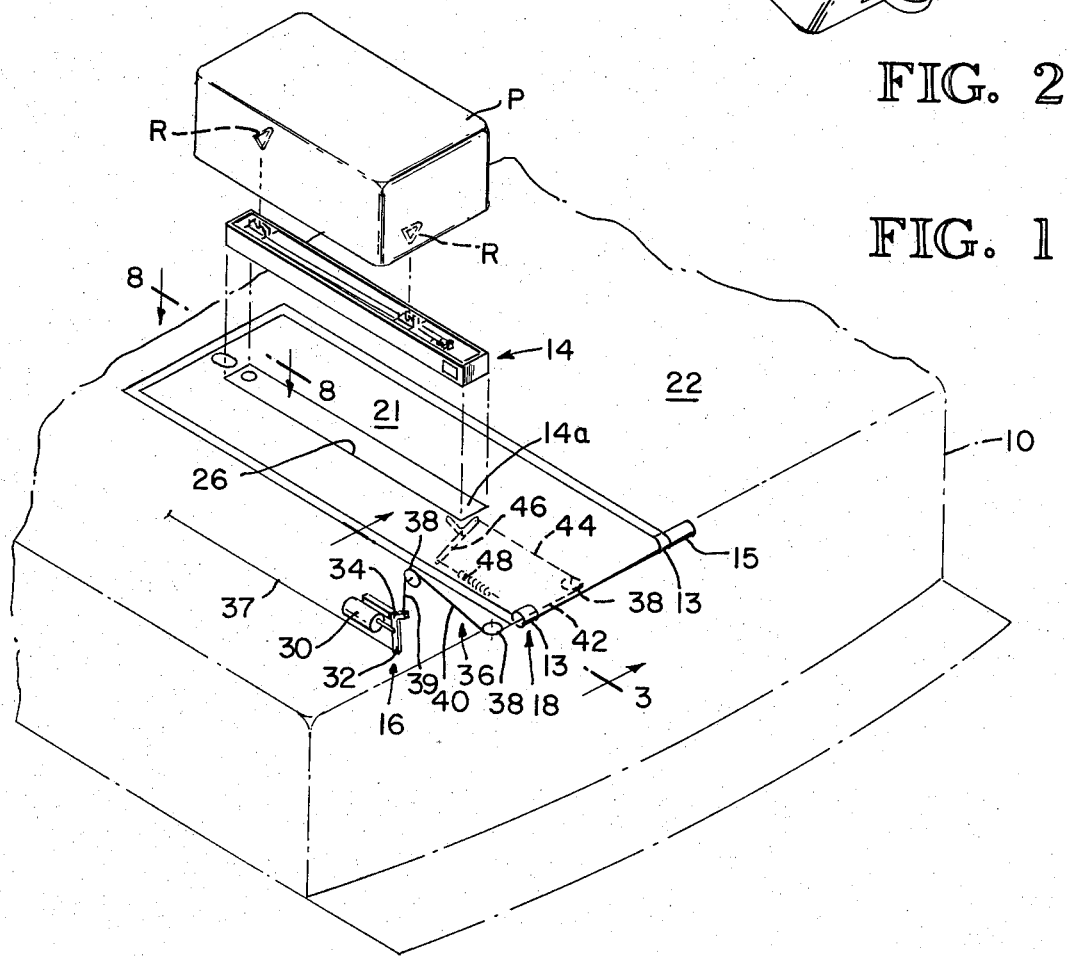
FIG. 1 is a perspective view of the parachute release apparatus of this invention, depicting the arm assembly in its stowed position.

Referring to the apparatus illustrated in FIGS. 1 and 2 of the drawings, the parachute release apparatus of this invention is particularly adapted for use with an aircraft which includes a raised tail assembly (not shown) and a cargo space terminating adjacent an aft opening below the tail assembly, however, it may be beneficially used in other environments. The aircraft additionally may include a movable rear loading ramp which is movable between a raised position which encloses at least the lower portion of the aft cargo space opening and a lowered position in which it coincides with or is substantially coplanar with the floor of the cargo space and constitutes an extension of the floor thereof. In FIGS. 1 and 2, the loading ramp or cargo floor, generally referenced by numeral 10, is illustrated in its lowered position. It is in this position that the loading ramp will be located during deployment and release of a parachute from the aircraft during an aerial cargo delivery operation.

In the example illustrated in FIGS. 1 and 2, the parachute release apparatus of this invention is mounted by the loading ramp 10 adjacent the rear edge 11 thereof. The apparatus includes an arm assembly, generally referenced by numeral 12, mounted by bearings 13 adjacent edge 11 for rotational movement between a stowed position (FIG. 1) faired with ramp 10 and a deployed position (FIG. 2) projecting aft and inclined downwardly from edge 11. Assembly 12 rotates with respect to a rotational axis coinciding with edge 11. A parachute holder, generally referenced by numeral 14, is operatively connectable with the arm assembly 12 for securing a parachute P thereto. The holder 14 is triggerable to release the parachute at a selected time by a release mechanism, generally referenced by numeral 16,. An arm position control assembly, generally referenced by numeral 18, is operatively associated with the arm assembly 12 for rotating the same bi-directionally between its FIG. 1 and FIG. 2 positions. In the example, assembly 18 includes a rotational actuator 15 together with stops (not shown) for positively locating the arm assembly at its FIG. 1 and FIG. 2 positions.

Still referring to FIGS. 1 and 2, a pan 20 is mounted by ramp 10 and forms a depression within which the arm assembly 12 is received when stowed as depicted in FIG. 1. This depression is of a depth sufficient that surface 21 of the arm assembly 12 is essentially coplanar with the upper surface 22 of ramp 10 when the arm assembly 12 is located in its FIG. 1 position. A tow plate 24 is mounted by the ramp 10 and is exposed to the lower surface of the pan 20. The tow plate acts as a force transfer device with respect to the deployed parachute and the load or object to be extracted from the aircraft via lines 27 and 28, respectively. The tow plate forms no part of the present invention. Line 27 may be looped between hooks 29 mounted by arm assembly 12, as depicted in FIG. 2, and is secured to the rear end of parachute P when deployed.

As most clearly illustrated in FIG. 2, the parachute P is located slightly above the underside of ramp 10 when the arm assembly 12 is located at its deployed position. Thus, the parachute will be adjacent the airstream flowing along the underside of ramp 10 when deployed for release; but will be shielded against the full force of this airstream by the body of ramp 10. Upon release, however, the parachute will drop into and be moved rearwardly away from the aircraft very rapidly by this airstream, thus ensuring that it will clear the aircraft. The length of the arm assembly and the angle of inclination thereof at its FIG. 2 deployed position therefore should be selected to obtain a deployed parachute location to fulfill these ends.

Referring again to FIG. 1, the parachute holder 14 is supported by and locked within the arm assembly 12. To this end, assembly 12 includes an elongated receptacle 26 which opens via surface 21 and registers with the outline of holder 14. Holder 14 is insertable through receptacle 26 and is received by assembly 12 either upright (referenced 14 in FIG. 1) or inverted (referenced 14a in FIG. 1) for attachment of parachute P or stowage, respectively. Holder 14 is secured within receptacle 26 by end hold down mechanisms described hereinafter with reference to FIGS. 8 and 9. With this construction, a parachute P, upon attachment to the arm assembly by the parachute holder, is movable in an aft direction along a curved path from a face-up stowed position adjacent the floor of the cargo space, in this case ramp surface 22, to a face-down deployed position aft of the cargo space.

The release mechanism 16 is operatively associated with the arm assembly 12 and the parachute holder 14 for releasing parachute P from the parachute holder when the arm assembly 12 is located at its deployed position, to effect separation of the parachute from the aircraft. In the example illustrated in FIG. 1, the release mechanism is made up of an operator 30 and a rocker arm 32 which is connected to and movable by operator 30 in a clockwise direction with respect to pivot 34, as illustrated in FIG. 1, to exert a tensile force on release cable 36. A manual cable operator 37 also is connected to and can move arm 32 correspondingly. Cable 36 is trained about three pulleys 38 and is guided thereby along a series of cable runs 39, 40, 42 and 44 to a spring biased release toggle 46 mounted within assembly 12 for operating the parachute holder 14, as will be described.

The release mechanism will now be described in further detail with specific reference to FIGS. 3 and 4. The cable 36 is maintained under tension along runs 39, 40, 42, 44 by a coil tension spring 48 fixed at one end to the interior of assembly 12 by spring mount 50. The other end of spring 48 is connected to one end of toggle 46, so as to apply counterclockwise rotational effort thereto with respect to pivot 51, as shown (FIG. 4). The opposite end of toggle 46 is connected to and exerts a tensile force upon cable 36 at the terminus of run 44. A force transmitting operator portion 52 projects generally transversely from toggle 46 for contact with a force receiving operator member 54 associated with the parachute holder 14, to be described. Cable 36 is guided along run 42 through the interior of the illustrated bearing 13 in coaxial alignment therewith.

Referring now to FIG. 10, the operator 30 preferably is constituted by a double-acting hydraulic or electric actuator. A pivotal force transmission member 60 is supported by pivot shaft 62 for pivotal movement responsive to operation of operator 30 in order to apply a parachute release force to cable 36 for transmission to member 54. Member 60 includes an intermediate slot 64 within which the end of cable 36 is secured. A fork-shaped connecting portion 66 projects downwardly from one end of the main body of member 60 and is attached to the distal end of a piston rod 68 associated with operator 30. A generally similar connecting portion 70 of increased length projects downwardly from the opposite end of the main body of member 60 for connection to manual operator 37. Rotational movement of member 60, in a clockwise direction as illustrated, will therefore apply a tensile force to cable 36 which, as described above, appears at member 54 as a parachute release force. Such rotation of member 60 is obtained by moving the lower end of either portion 66 or portion 70 in a forward direction by operators 30 or 37, respectively, as indicated by the arrows.

Referring to FIGS. 5-9 of the drawings, the parachute holder includes an elongated housing 80 having a rectangular outline which conforms to and registers with the outline of receptacle 26. The housing as illustrated in FIG. 5 has an open top, bottom wall 81; side walls 82, 84; and end walls 86, 88. It is positionable within receptacle 26 in either an upright or an inverted position with respect to the arm assembly 12, as illustrated in FIG. 1. In the upright position of FIG. 5, the housing is operative to accept a parachute in preparation for deployment thereof in connection with an aerial cargo delivery operation. Toward this end, the housing may be removed from the receptacle and fitted to a parachute at a separate location. In the inverted position of FIG. 9, surface 90 of bottom wall 81 is face-up and is located in generally coplanar alignment with surface 21 of the arm assembly 12. In the latter position, surface 21, surface 90 and surface 22 together present a continuous load bearing surface which does not interfere with or impede utility of the loading ramp 10. The arm assembly includes interior end wall 92 (FIG. 9) and parallel side walls 94 (FIG. 4; only one shown) which together form receptacle 26 for receiving housing 80. Housing 80 rests on shoulders (not shown) which project inwardly from side walls 94. Parallel grooves 96 formed by the arm assembly house hooks 29 for securing line 27, as shown (FIG. 1). Wall 81 includes a circular finger opening 97 (see FIGS. 8 and 9) through which the housing may be gripped and lifted out of receptacle 26 when located in the FIG. 9 position.

Referring to FIGS. 8 and 9, the housing 80 is secured to the arm assembly within receptacle 26 by fore and aft end hold down assemblies generally referenced by numerals 98 and 100, respectively. The aft end hold down assembly 100 is made up of an L-shaped bracket 102 which is connected to wall 92 and which includes a transverse projection 104 extending generally parallel to the length of the receptacle 26 (see FIG. 1). An elongated slot 105 is formed in wall 88 and receives projection 104, as shown (FIG. 9). The fore end hold down assembly 98 is made up of a movable latch 106 which is supported by pivot 108 within the arm assembly 12. Latch 106 is biased by spring 110 in a clockwise direction, as illustrated in FIG. 9, toward a position in which it engages an elongated slot 111 formed in wall 86 when housing 80 is located in receptacle 26. Latch 106 therefore is normally spring biased toward the position illustrated in FIG. 9 in which it is engageable with slot 111 to lock the forward end of the housing 80 to the arm assembly 12. To release the fore hold down assembly 98, a release operator 112 is connected to latch 106 and projects in a generally upward inclined direction toward surface 21. A pressure surface 114 is formed by the upper surface of operator 112 and has an oval outline which registers with, but is slightly smaller than a corresponding opening formed in surface 21. Surface 114 may be depressed manually to rotate the latch in a counterclockwise direction to release the forward end of the housing 80, whereupon the housing may be lifted out of receptacle 26.

To remove the parachute holder 14, therefore, surface 114 is depressed, whereupon its forward end may be lifted. The rear end of the holder may be disengaged from the aft end hold down assembly 100 by moving the holder forward a sufficient distance to withdraw portion projection 104 from slot 105. To replace the parachute holder this process is repeated in reverse sequence. Slots 105 and 111 are formed at approximately midpoints of end walls 88 and 86 and therefore are adapted to engage the end hold down assemblies 98 and 100, respectively, in either the upright or inverted positions of the housing illustrated.

Referring to FIGS. 5–7, the parachute holder 14 includes a release subassembly, which is supported within housing 80. This subassembly includes two spaced apart parachute hook mechanisms 120, 122 for respectively engaging two parachute rings R of conventional design. Each hook mechanism includes a stationary guide plate 124 which forms two spaced apart shoulders 126 between which is formed a generally U-shaped recess 127 within which a ring R is insertable. A ring hook 128 is biased by spring 130 in, as illustrated in FIG. 7, a clockwise direction toward a closed position in which it is engageable with ring R positioned within recess 127, to thereby retain and positively lock the parachute P to the holder 14. The aft hook mechanism 122 is operable by a rear force transmission linkage 132 which is connected to and movable by the force receiving operator member 54 toward an open position in which ring R is released. A forward force transmission linkage 134 is connected between the fore and aft hook mechanisms 120, 122, respectively, and moves the foward hook mechanism in unison with the aft hook mechanism. Member 54 is biased outwardly in a clockwise direction as illustrated in FIG. 6, by spring 136, to maintain contact with operator portion 52. Member 54 is exposed to portion 52 by a rectangular opening 138 formed in the aft end of sidewall 82 of housing 80. When member 54 is moved inwardly or counterclockwise, as illustrated in FIG. 6, by a force applied by operator portion 52, the fore and aft hook mechanisms 120, 122, respectively, are opened simultaneously to release the parachute P.

Although one preferred embodiment of the invention has been illustrated and described herein, variations will become apparent to one of ordinary skill in the art. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. Apparatus for releasing parachutes from an aircraft comprising: arm means mounted adjacent an opening in the aircraft for movement between an inboard, face up stowed position and an outboard, face down deployed position; holder means, removably mounted on said arm means, for releasably holding a parachute; means for actuating said holder means and means for controlling said actuating means to selectively release said parachute after said arm is deployed, whereby said holder means may be attached to said parachute at a location remote from said opening and then both may be attached to said arm means while in its inboard, stowed position.

2. The apparatus as defined in claim 1, further comprising means for mounting said arms means so that, in said stowed position, a first surface of said arm means is substantially level with an interior surface of said aircraft and in said deployed position, said parachute drops free of said aircraft by gravity.

3. The apparatus as defined in claim 2 wherein said interior surface is the aircraft floor and said arm means is mounted adjacent an aft edge thereof.

4. The apparatus as defined in claim 2 wherein said interior surface is a loading ramp attached to said aircraft and said arm means is mounted adjacent an aft edge thereof.

5. The apparatus as defined in claim 3 or 4 further comprising means for pivotally mounting said arm means for movement between face up stowed and face down deployed positions and means for moving said arm means about said pivot means.

6. The apparatus as defined in claim 5 further comprising receptacle means for removably mounting said holder means in either of two positions.

7. The apparatus as defined in claim 6, said holder means further comprising parachute attachment means exposed through a first side thereof and a substantially enclosed, opposite second side, whereby, when said holder means is mounted in one of said positions said attachment means is exposed and when in the other position said opposite, substantially enclosed side is exposed, in either position said holder is substantially level with said first surface of said arm means.

8. The apparatus as defined in claim 7, wherein said control means includes remotely actuated power means and manually actuated backup means to ensure accurate release of said parachute.

9. A method of releasing a parachute from an aircraft comprising the steps of: first attaching said parachute to a holder; then attaching said holder to an arm; then moving said arm through a curved path from a face up inboard stowed position to a face down, outboard deployed position and finally actuating said holder to release said parachute.

10. The method of claim 9 wherein said parachute is so located with respect to said face down arm in said deployed position that once released from said holder it will drop clear of said aircraft by gravity.

* * * * *